United States Patent
Bringuier et al.

(10) Patent No.: US 9,323,022 B2
(45) Date of Patent: Apr. 26, 2016

(54) METHODS OF MAKING AND ACCESSING CABLES HAVING ACCESS FEATURES

(71) Applicants: Anne Germaine Bringuier, Taylorsville, NC (US); Michael John Gimblet, Conover, NC (US); Julian Latelle Greenwood, III, Hickory, NC (US); Samuel Don Navé, Newton, NC (US)

(72) Inventors: Anne Germaine Bringuier, Taylorsville, NC (US); Michael John Gimblet, Conover, NC (US); Julian Latelle Greenwood, III, Hickory, NC (US); Samuel Don Navé, Newton, NC (US)

(73) Assignee: CORNING CABLE SYSTEMS LLC, Hickory, NC (US)

( * ) Notice: Subject to any disclaimer, the term of this patent is extended or adjusted under 35 U.S.C. 154(b) by 554 days.

(21) Appl. No.: 13/646,962

(22) Filed: Oct. 8, 2012

(65) Prior Publication Data

US 2014/0099062 A1   Apr. 10, 2014

(51) Int. Cl.
*G02B 6/44* (2006.01)

(52) U.S. Cl.
CPC ............ *G02B 6/4495* (2013.01); *G02B 6/4486* (2013.01)

(58) Field of Classification Search
None
See application file for complete search history.

(56) References Cited

U.S. PATENT DOCUMENTS

| | | |
|---|---|---|
| 3,076,235 A | 2/1963 | Rollins et al. |
| 3,991,014 A | 11/1976 | Kleinschuster ................. 260/47 |
| 4,067,852 A | 1/1978 | Calundann ....................... 260/47 |
| 4,083,829 A | 4/1978 | Calundann et al. ............ 260/47 |
| 4,130,545 A | 12/1978 | Calundann .................... 260/40 P |
| 4,237,337 A | 12/1980 | Serrander .................... 174/70 R |
| 4,248,824 A | 2/1981 | Hattop ............................ 264/171 |
| 4,318,842 A | 3/1982 | East et al. ...................... 524/605 |
| 4,456,331 A | 6/1984 | Whitehead et al. ........ 350/96.23 |
| 4,468,364 A | 8/1984 | Ide .............................. 264/176 R |
| 4,707,074 A | 11/1987 | Heywood ................... 350/96.23 |
| 4,729,628 A | 3/1988 | Kraft et al. ................. 350/96.23 |
| 4,848,868 A | 7/1989 | Rohner ....................... 350/96.23 |
| 5,218,659 A | 6/1993 | Schneider ...................... 385/110 |
| 5,360,497 A | 11/1994 | Schneider et al. ............. 156/47 |
| 5,442,722 A | 8/1995 | DeCarlo ........................ 385/114 |
| 5,636,308 A | 6/1997 | Personne et al. ............. 385/102 |
| 5,651,081 A | 7/1997 | Blew et al. .................... 385/101 |
| 5,717,805 A | 2/1998 | Stulpin .......................... 385/114 |
| 5,737,470 A | 4/1998 | Nagano et al. ................ 385/114 |
| 5,970,196 A * | 10/1999 | Greveling et al. ............ 385/114 |
| 5,987,204 A | 11/1999 | Lee et al. ....................... 385/100 |

(Continued)

FOREIGN PATENT DOCUMENTS

| | | | |
|---|---|---|---|
| DE | 4421456 A1 | 12/1995 | ............. B29C 47/02 |
| EP | 647866 A1 | 4/1995 | ............... G02B 6/44 |

(Continued)

OTHER PUBLICATIONS

U.S. Appl. No. 13/445,517, filed Apr. 12, 2012, Eric R. Logan, 29 pages.

(Continued)

*Primary Examiner* — Tina Wong
(74) *Attorney, Agent, or Firm* — William D. Doyle

(57) ABSTRACT

Cables jacket are formed by extruding discontinuities in a main cable jacket portion. The discontinuities allow the jacket to be torn to provide access to the cable core. The discontinuities can be longitudinally extending strips of material in the cable jacket, and can be introduced into the extrudate material flow used to form the main portion through ports in the extrusion head. The discontinuities allow a section of the cable jacket to be pulled away from a remainder of the jacket using a relatively low peel force.

6 Claims, 13 Drawing Sheets

(56) References Cited

U.S. PATENT DOCUMENTS

| | | | | |
|---|---|---|---|---|
| 6,041,153 | A | 3/2000 | Yang | 385/109 |
| 6,088,499 | A | 7/2000 | Newton et al. | 385/112 |
| 6,137,936 | A | 10/2000 | Fitz et al. | 385/113 |
| 6,167,180 | A | 12/2000 | Keller | 385/113 |
| 6,222,969 | B1 | 4/2001 | Botelho et al. | 385/114 |
| 6,311,000 | B1 | 10/2001 | Schneider | 385/113 |
| 6,351,589 | B1 | 2/2002 | Leggett | 385/128 |
| 6,404,962 | B1 | 6/2002 | Hardwick, III et al. | 385/114 |
| 6,519,396 | B2 | 2/2003 | Schneider et al. | 385/101 |
| 6,542,674 | B1 | 4/2003 | Gimblet | 385/113 |
| 6,545,222 | B2 * | 4/2003 | Yokokawa et al. | 174/110 R |
| 6,546,176 | B2 | 4/2003 | Anderson et al. | 385/113 |
| 6,563,991 | B1 | 5/2003 | Witt et al. | 385/107 |
| 6,603,908 | B2 | 8/2003 | Dallas et al. | 385/109 |
| 6,661,956 | B2 | 12/2003 | Yamasaki et al. | 385/109 |
| 6,704,481 | B2 | 3/2004 | Gaillard et al. | 385/113 |
| 6,728,455 | B2 | 4/2004 | Kusakari et al. | 385/113 |
| 6,760,522 | B2 | 7/2004 | Okada et al. | 385/109 |
| 6,766,091 | B2 | 7/2004 | Beuth et al. | 385/128 |
| 6,813,421 | B2 | 11/2004 | Lail et al. | 385/101 |
| 6,876,798 | B2 | 4/2005 | Triplett et al. | 385/100 |
| 6,957,000 | B2 | 10/2005 | McAlpine et al. | 385/102 |
| 7,029,137 | B2 | 4/2006 | Lionetti et al. | 362/84 |
| 7,050,685 | B2 | 5/2006 | Plemmons et al. | 385/109 |
| 7,085,459 | B2 * | 8/2006 | Conrad et al. | 385/114 |
| 7,116,872 | B2 | 10/2006 | Okuno et al. | 385/114 |
| 7,123,801 | B2 | 10/2006 | Fitz | 385/105 |
| 7,136,556 | B2 | 11/2006 | Brown et al. | 385/102 |
| 7,187,830 | B2 | 3/2007 | Blazer | 385/114 |
| 7,197,215 | B2 | 3/2007 | Baird et al. | 385/113 |
| 7,218,821 | B2 | 5/2007 | Bocanegra et al. | 385/103 |
| 7,225,534 | B2 | 6/2007 | Kachmar | 29/825 |
| 7,251,411 | B1 | 7/2007 | Lu et al. | 385/147 |
| 7,346,244 | B2 | 3/2008 | Gowan et al. | 385/113 |
| 7,379,642 | B2 | 5/2008 | Kachmar | 385/102 |
| 7,391,943 | B2 * | 6/2008 | Blazer et al. | 385/100 |
| 7,400,810 | B2 | 7/2008 | Tanaka et al. | 385/134 |
| 7,403,685 | B2 | 7/2008 | Wells | 385/100 |
| 7,415,181 | B2 | 8/2008 | Greenwood et al. | 385/100 |
| 7,424,189 | B2 | 9/2008 | Lu et al. | 385/100 |
| 7,471,862 | B2 | 12/2008 | Bringuier et al. | 385/113 |
| 7,480,436 | B2 | 1/2009 | Wells et al. | 385/134 |
| 7,489,843 | B2 | 2/2009 | Carlson et al. | 385/100 |
| 7,532,796 | B2 | 5/2009 | Chiasson | 385/114 |
| 7,539,380 | B1 | 5/2009 | Abernathy et al. | 385/105 |
| 7,567,741 | B2 | 7/2009 | Abernathy et al. | 385/113 |
| 7,587,111 | B2 | 9/2009 | de Montmorillon et al. | 385/127 |
| 7,590,321 | B2 | 9/2009 | Lu et al. | 385/104 |
| 7,603,012 | B1 | 10/2009 | Ice | 385/103 |
| 7,623,747 | B2 | 11/2009 | De Montmorillon et al. | 385/124 |
| 7,693,375 | B2 | 4/2010 | Freeland et al. | 385/100 |
| 7,787,727 | B2 | 8/2010 | Bringuier et al. | 385/113 |
| 7,796,853 | B2 | 9/2010 | Abernathy et al. | 385/100 |
| 7,817,891 | B2 | 10/2010 | Lavenne et al. | 385/109 |
| 8,582,939 | B2 * | 11/2013 | Gimblet et al. | 385/100 |
| 8,798,418 | B2 * | 8/2014 | Davies et al. | 385/113 |
| 8,909,014 | B2 * | 12/2014 | Gimblet et al. | 385/113 |
| 2003/0118295 | A1 | 6/2003 | Lail et al. | 385/101 |
| 2004/0086242 | A1 * | 5/2004 | McAlpine et al. | 385/102 |
| 2006/0045443 | A1 | 3/2006 | Blazer | 385/114 |
| 2006/0127016 | A1 | 6/2006 | Baird et al. | 385/114 |
| 2006/0291787 | A1 | 12/2006 | Seddon | 385/113 |
| 2008/0013899 | A1 | 1/2008 | Gowan et al. | 385/113 |
| 2008/0193092 | A1 | 8/2008 | Greenwood et al. | 385/113 |
| 2009/0087148 | A1 | 4/2009 | Bradley et al. | 385/76 |
| 2009/0274425 | A1 | 11/2009 | Caldwell et al. | 385/102 |
| 2009/0274426 | A1 | 11/2009 | Lail | 385/105 |
| 2009/0317039 | A1 | 12/2009 | Blazer et al. | 385/107 |
| 2009/0324182 | A1 | 12/2009 | Kachmar et al. | 385/104 |
| 2010/0132973 | A1 | 6/2010 | Fitz et al. | 174/102 R |
| 2011/0052127 | A1 * | 3/2011 | Bollinger et al. | 385/112 |
| 2011/0217010 | A1 | 9/2011 | Kachmar | 385/111 |
| 2011/0229098 | A1 | 9/2011 | Abernathy et al. | 385/102 |

FOREIGN PATENT DOCUMENTS

| | | | | |
|---|---|---|---|---|
| EP | 749129 | A1 | 12/1996 | H01B 7/00 |
| EP | 1168024 | B1 | 1/2002 | G02B 6/44 |
| EP | 1376156 | B1 | 7/2006 | G02B 1/04 |
| GB | 2355335 | B | 1/2004 | H01B 7/00 |
| JP | 60-91306 | A | 5/1985 | G02B 6/24 |
| JP | 63-120206 | U | 8/1988 | G02B 6/08 |
| JP | 9-230184 | A | 9/1997 | G02B 6/44 |
| JP | 2005-148373 | A | 6/2005 | G02B 6/44 |
| JP | 2005-345622 | A | 12/2005 | G02B 6/44 |
| JP | 2006-162703 | A | 6/2006 | G02B 6/44 |
| JP | 2006-171570 | A | 6/2006 | G02B 6/44 |
| JP | 2006-251769 | A | 9/2006 | G02B 6/44 |
| JP | 2006-251770 | A | 9/2006 | G02B 6/44 |
| JP | 2006-267600 | A | 10/2006 | G02B 6/44 |
| JP | 2007-272006 | A | 10/2007 | G02B 6/44 |
| JP | 2009-037150 | A | 2/2009 | G02B 6/44 |
| JP | 2009-258153 | A | 11/2009 | G02B 6/44 |
| KR | 2006-0081266 | | 7/2006 | G02B 6/44 |
| KR | 2006-0107414 | | 10/2006 | G02B 6/02 |
| WO | 03/046074 | A1 | 6/2003 | C08L 23/16 |
| WO | 2004/021367 | A2 | 3/2004 | H01B 7/00 |
| WO | 2005/096053 | A1 | 10/2005 | G02B 6/44 |
| WO | 2006/097540 | A1 | 9/2006 | G02B 6/44 |
| WO | 2011/109498 | A2 | 9/2011 | |
| WO | 2011/137236 | A1 | 11/2011 | B29C 47/02 |
| WO | 2012/058181 | A1 | 5/2012 | G02B 6/44 |
| WO | 2012/071490 | A2 | 5/2012 | B29C 47/02 |

OTHER PUBLICATIONS

U.S. Appl. No. 13/489,901, filed Jun. 6, 2012, Michael J. Gimblet, 23 pages.
U.S. Appl. No. 13/560,374, filed Jul. 27, 2012, Michael John Gimblet, 24 pages.
U.S. Appl. No. 13/646,962, filed Oct. 8, 2012, Anne Germaine Bringuier, 26 pages.
U.S. Appl. No. 13/658,404, filed Oct. 23, 2012, Michael John Gimblet, 21 pages.
U.S. Appl. No. 13/658,431, filed Oct. 23, 2012, Samuel Don Nave, 19 pages.
Nippon Telegraph and Telephone Corporation, Specification for Aerial SM Optical Fiber Cable, Spec. No. 520292, 4$^{th}$ Version, Jul. 29, 2002, 56 pages.
Renka Corporation, Single Mode Optical Fiber Cable, Specification No. RENKA/OFC/SM-DI/AR, Dec. 2000, 13 pages.
PCT IPRP for Publication WO2011137236, Nov. 6, 2011, 10 pages.
PCT ISR for Publication WO2011137236, Aug. 9, 2011, 6 pages.
PCT ISR for Publication WO2012058181, Feb. 23, 2012, 4 pages.
PCT ISR for Publication WO2012071490, Sep. 12, 2012, 7 pages.
Patent Cooperation Treaty, International Search Report and Written Opinion for International Application No. PCT/US2012/059651; Mailing date Jan. 18, 2013—11 pages.

* cited by examiner

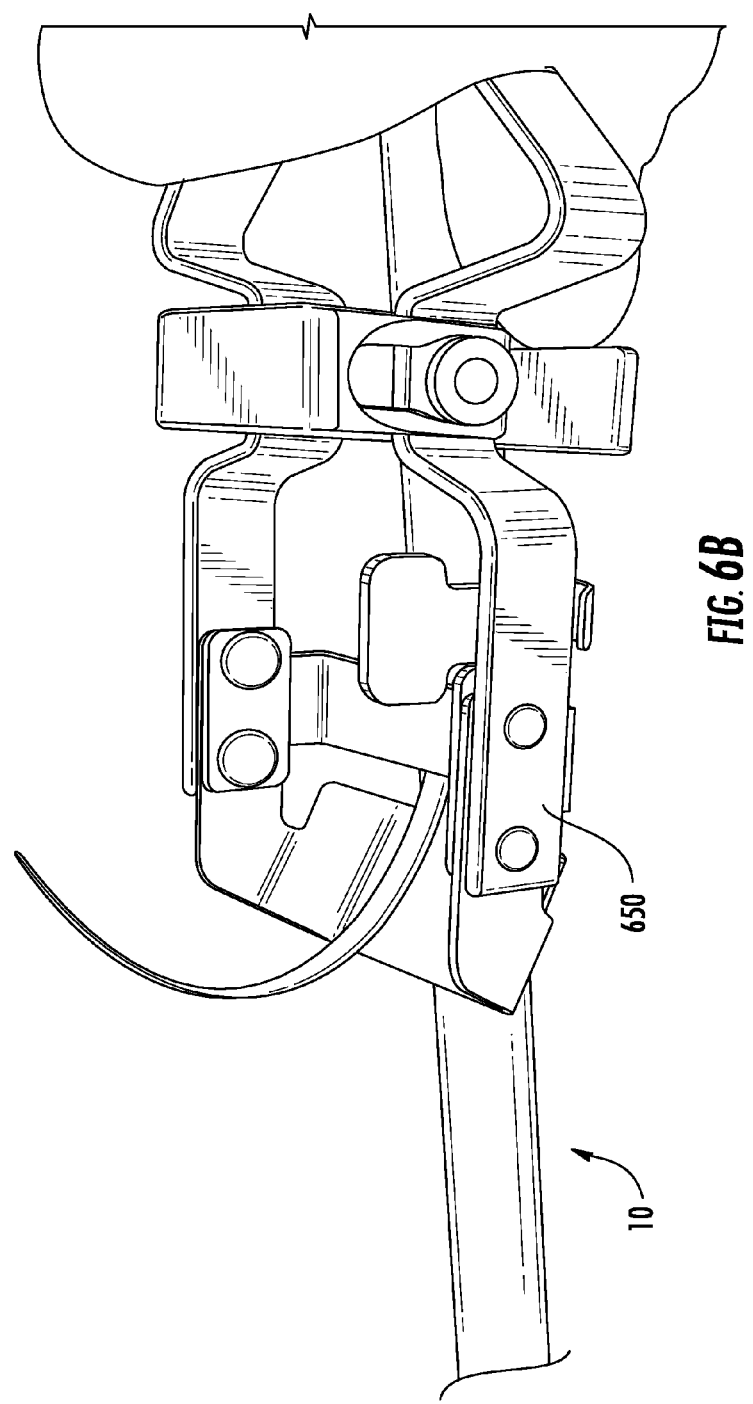

METHODS OF MAKING AND ACCESSING CABLES HAVING ACCESS FEATURES

RELATED APPLICATIONS

This application claims the benefit of priority under 35 U.S.C. §119 of U.S. Provisional Application Ser. No. 61/546,597 filed on Oct. 13, 2011, the content of which is relied upon and incorporated herein by reference in its entirety.

This application is related to PCT/US11/34309, filed Apr. 28, 2011, and to U.S. Prov. App. No. 61/407,744, filed Oct. 28, 2010, U.S. Prov. App. No. 61/416,684, filed Nov. 23, 2010, and to U.S. Prov. App. No. 61/546,94, filed Oct. 13, 2011, each of which is incorporated by reference herein in its entirety.

BACKGROUND

1. Field of the Disclosure

A fiber optic cable is disclosed, specifically a fiber optic cable having access features for accessing a core of the fiber optic cable.

2. Technical Field

Fiber optic cables frequently require that the fibers inside are accessed mid-span rather than at an end of the cable. This often requires extensive cutting of the cable jacket to enable a portion of the jacket to be removed, allowing access to the fibers inside the jacket. Conventional cutting tools, such as box cutters or custom cutting tools, can be cumbersome and dangerous, both to the operator and to the delicate optical fibers. Rip cords in a cable jacket can be used for cable access, but they add cost and require time and training in order for the craftsman to use them properly. In one conventional access process, a jacket is pierced using a first tool, and a second tool is used to "fish" out enough of the rip cord so that a third tool (e.g., pliers) can grasp the rip cord. A pull force must then be applied to the rip cord, tearing it through the jacket material. The jacket material is then peeled away from the cable core and removed. If the rip cord breaks, the cord must be "fished" out again.

BRIEF DESCRIPTION OF THE DRAWINGS

According to common practice, the various features of the drawings discussed below are not necessarily drawn to scale. Dimensions of various features and elements in the drawings may be expanded or reduced to more clearly illustrate the embodiments of the invention.

FIGS. 6A-6C illustrate a process for mid-span access for a cable as illustrated in FIG. 1.

DETAILED DESCRIPTION

Figure 1:
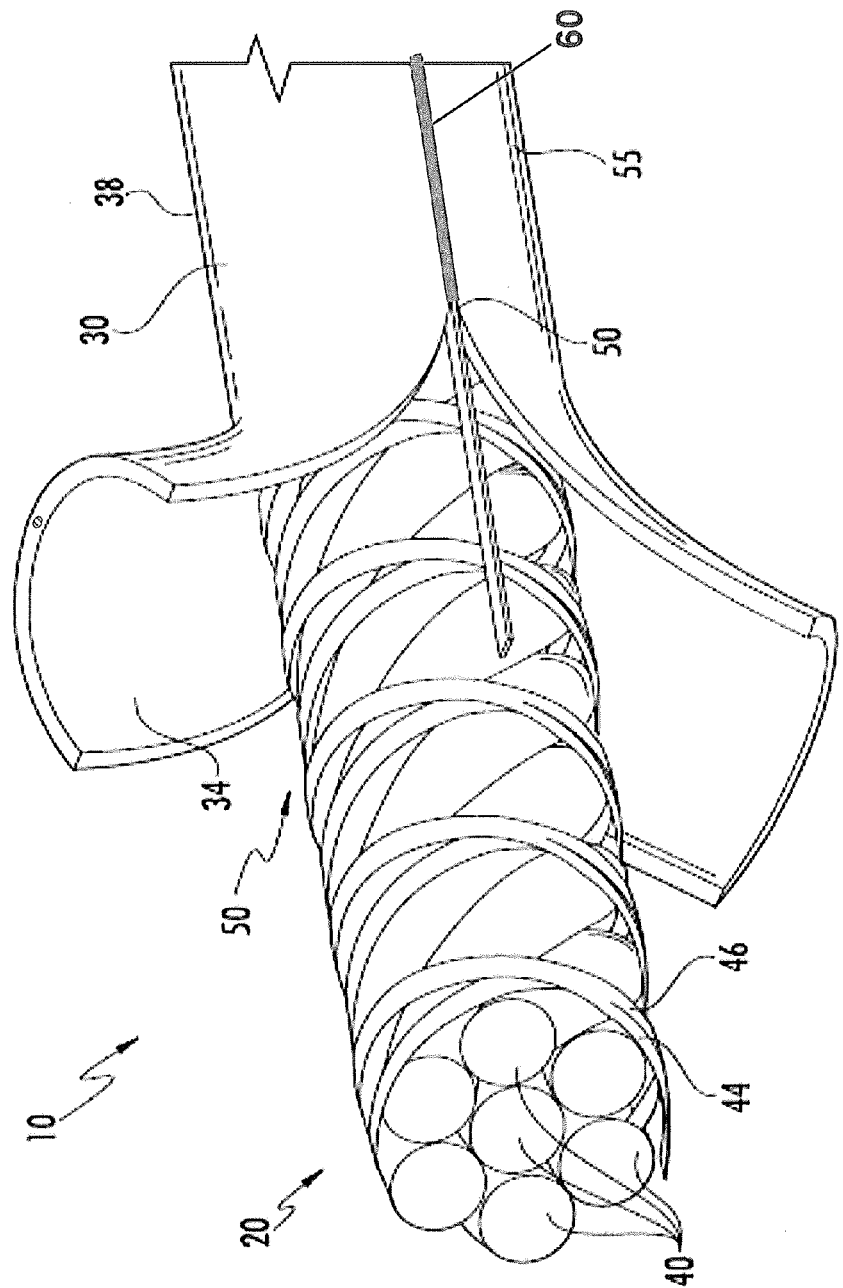
FIG. 1 is a partial cutaway view of a fiber optic cable according to a first embodiment.

Reference is now made in detail to the present preferred embodiments of the disclosure, examples of which are illustrated in the accompanying drawings. Whenever possible, identical or similar reference numerals are used throughout the drawings to refer to identical or similar parts.

FIG. 1 is a partial cutaway view of a fiber optic cable 10 according to a present embodiment. The cable 10 comprises a core 20 surrounded by a jacket 30. The jacket 30 has an interior surface 34 that faces the core 20, and an exterior surface 38. The jacket 30 can be formed primarily from polymer materials, and can be generally referred to as "polymeric." In this specification, the terms "polymer" and "polymeric" indicate materials comprised primarily of extrudable polymer materials such as, for example, copolymers, but allows for the presence of non-polymer materials such as additives and fillers. The core 20 can be, for example, an assembly or arrangement having data-transmission and/or power-transmission capabilities. In the illustrated embodiment, the core 20 includes a bundle of optical fibers 40 bundled within contrahelically wound binders 44, 46, the optical fibers being capable of conveying optical data.

The jacket 30 includes a separation feature that facilitates access to the core 20. In the exemplary embodiment, the separation feature is a pair of extruded discontinuities 50 that extend along the length of the cable 10. In this specification, the term "discontinuity" indicates a portion of the jacket 30 of different material composition than the main portion of the jacket 30, the main portion being indicated by reference number 55. The main portion 55 can essentially be an annular hoop surrounding the core 20, with the discontinuities 50 extending longitudinally through the main portion 55 along a selected length of the cable 10. According to one aspect, the discontinuities 50 provide lines of weakness that allow the jacket 30 to be separated as shown in FIG. 1. The illustrated discontinuities 50 extend along the entire cable length, although shorter lengths, such as 20 cm or more, may be used to provide access to the core 20.

Figure 2:
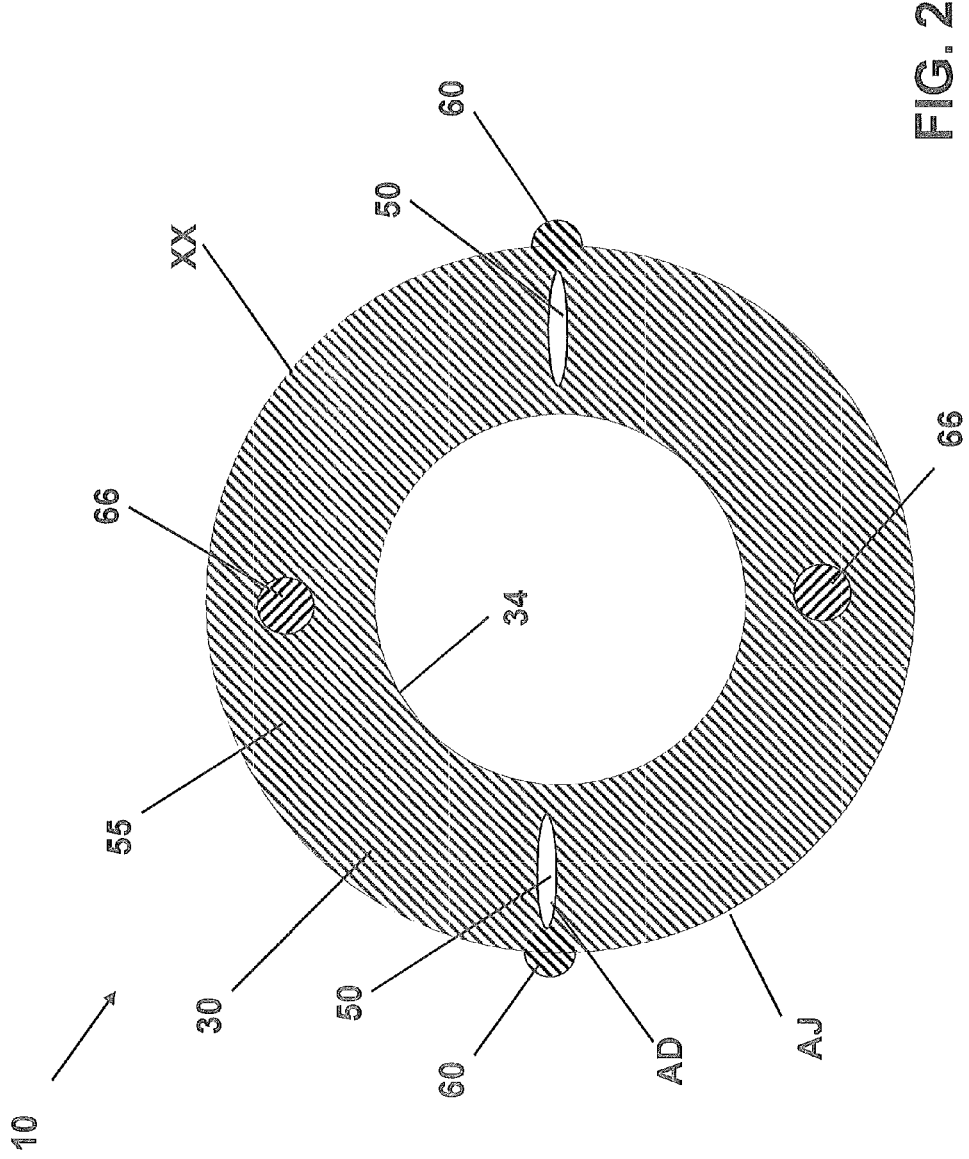
FIG. 2 is a cross-section of the cable jacket illustrated in FIG. 1.

FIG. 2 is a cross-section of the jacket 30 in isolation, taken on a plane perpendicular to a length of the cable 10. In the exemplary embodiment, the discontinuities 50 are bonded to the main portion of the jacket 55 when the jacket 30 is extruded. The illustrated discontinuities 50 are wholly embedded in the main portion 55, but one or both ends of the discontinuities may extend to either jacket surface. The main portion 55 and the discontinuities 50 can be formed from extrudable polymers, so that as the extrudates used to form the main portion 55 and the discontinuities 50 cool and solidify, the extrudates become bonded to a desired degree at an interface on each side of a discontinuity 50. When the discontinuities 50 are formed while extruding the main portion 55 of the jacket, the bond between discontinuity 50 and the remainder of the jacket 30 can be generally described as enabled by polymer chain entanglement as the jacket 30 solidifies. The jacket 30 accordingly comprises a cohesive composite polymer structure. The cable jacket 30 can also include tactile locator features 60, such as raised surfaces, or 'bumps', or depressed surfaces such as 'divots' or channels, that provide a tactile indication of the location of the discontinuities. A visual indication such as a stripe could also be extruded over the location of the discontinuities so that their locations are apparent from the cable exterior. Tactile or visual indicators can extend along the entire length of the cable, or along selected lengths. One or more strength members, such as glass-reinforced plastic (GRP) rods or metallic wires can be included at one or more locations in the jacket 30.

The discontinuities 50 can be strips that may each occupy up to, for example, 5% of the total jacket cross-sectional area AJ. In exemplary embodiments, discontinuities 50 can be relatively narrow strips in the jacket 30, and may occupy relatively small portions of the jacket cross-sectional area AJ. For example, the discontinuities 50 can have cross-sectional areas AD that are less than 3% of AJ. In the illustrated embodiment, the discontinuities 50 each have cross-sectional areas AD that are less than 2% of AJ. In FIGS. 1 and 2, two discontinuities 50 are formed in the jacket 30 to facilitate opening of the jacket as shown in FIG. 1. Depending on the form that the core 20 takes, the number, spacing, shape, composition and other aspects of the discontinuities 50 can be varied. For example, a single discontinuity in the jacket 30 may be sufficient to allow the cable jacket 30 to be peeled away from the core 20.

Figure 3:
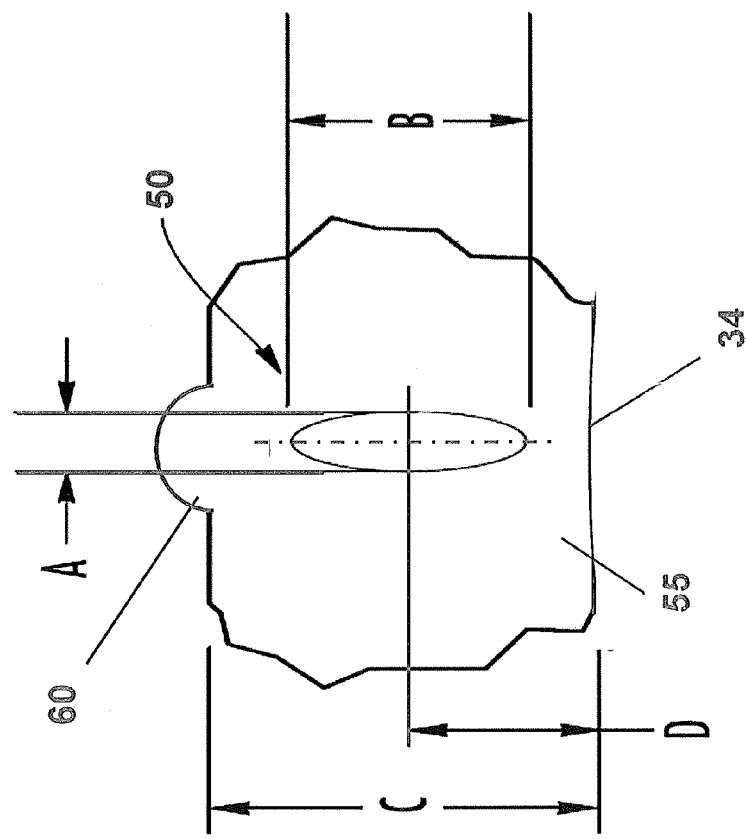
FIG. 3 is an isolated cross-sectional view of one of the discontinuities in the cable jacket of FIG. 2.

FIG. 3 is an isolated view of one of the discontinuities 50 in the jacket 140. A discontinuity 180 can have a maximum width A, a height B, and a center spacing from the jacket interior surface 34 of D. The jacket thickness is C. According to one aspect, the aspect ratio A:B is in the range of 1:4 to 1:100. In general, lower aspect ratios A:B, which indicates narrower discontinuities, are favorable in cable cross-sections as shown in FIG. 1. It is these discontinuities that allow for a stress concentration to develop at the root of a discontinuity and thus initiate failure of the primary jacket material. The illustrated ratio B:C is about 1:2, which indicates that the height of a discontinuity is about half of the jacket thickness. The ratio B:C is selected to provide ease of access to the core and to maintain sufficient robustness of the cable 110, and will vary with factors such as the fracture toughness of the material of the primary portion 55, the bond between the discontinuities 50 and the primary portion 55, and other factors. According to one embodiment, the ratio B:C is at least 1:4, or, stated alternatively, B is at least ¼ of the jacket thickness C at the centerline of the cable. If an extremely thin, "film" type embodiment of discontinuity 50 is included, the maximum width W of a discontinuity can be in the range of 0.2 mm or less, and may be about 0.1 mm.

The materials and processes used to form the main portion 55 and the discontinuities 50 can be selected so that the interfaces therebetween allow for relatively easy access to the core 20 by peeling back the jacket 30 as shown in FIG. 1. The cable 10 may be constructed to meet other requirements for robustness, such as requirements for the jacket 30 stay intact under tensile loads, twisting, in temperature variations, and when subjected to other known cable test criteria, such as, for example, ICEA 460, and GR20.

The cable jacket main portions 55 and the discontinuities 50 described in this specification may be made from various polymer materials. Either the main portion 55 or the discontinuities 50 may be made from polypropylene (PP), polyethylene (PE), or blends of materials such as a blend of PE and ethylene vinyl acetate (EVA), flame-retardant material such as flame-retardant polyethylene, flame-retardant polypropylene, polyvinyl chloride (PVC), or polyvinylidene fluoride (PVDF), filled materials such as polybutylene terephthalate (PBT), a polycarbonate and/or a polyethylene (PE) material and/or an ethylene vinyl acrylate (EVA) or other blends thereof having fillers like a chalk, talc, or the like, and other materials such as a UV-curable acrylates.

In the exemplary embodiments, the main portion can be extruded from a first extrudable polymeric material comprising at least 80% of a first polymer, polyethylene, by weight, and the discontinuities can be extruded from a second extrudable polymeric material comprising at least 70% of a second polymer, polypropylene, by weight and additionally at least 0.5% of the first polymer polyethylene by weight. Higher amounts by weight of the first polymer may be included in the second material, such as at least 1.0%, or at least 2%. Without being bound by theory, Applicants believe the bond between polypropylene and polyethylene may be caused by one or both of quantities of ethylene that are compounded in the polypropylene bonding with the polyethylene, and molecular entanglement between the PE and PP. According to this understanding, the amount of ethylene in the PP extrudate can be increased to increase the bond between the discontinuities and the remainder of the jacket. In one embodiment, the main portion 55 is made from a first polyethylene extruded material, such as a medium density polyethylene (MDPE). The discontinuities 50 are made from a second, polypropylene/polyethylene blend of extruded material, the blend including from 6% to 20% polyethylene, with the remainder of the blend being primarily a polypropylene material. The first polymer material can be, for example, a unimodal or bimodal type polyethylene defined by its molecular weight distribution, with the lower molecular weight polymer chains increasing bond strength at the interface of the jacket and the feature (through the process of promoting entanglements and co-crystallization).

Figure 4:
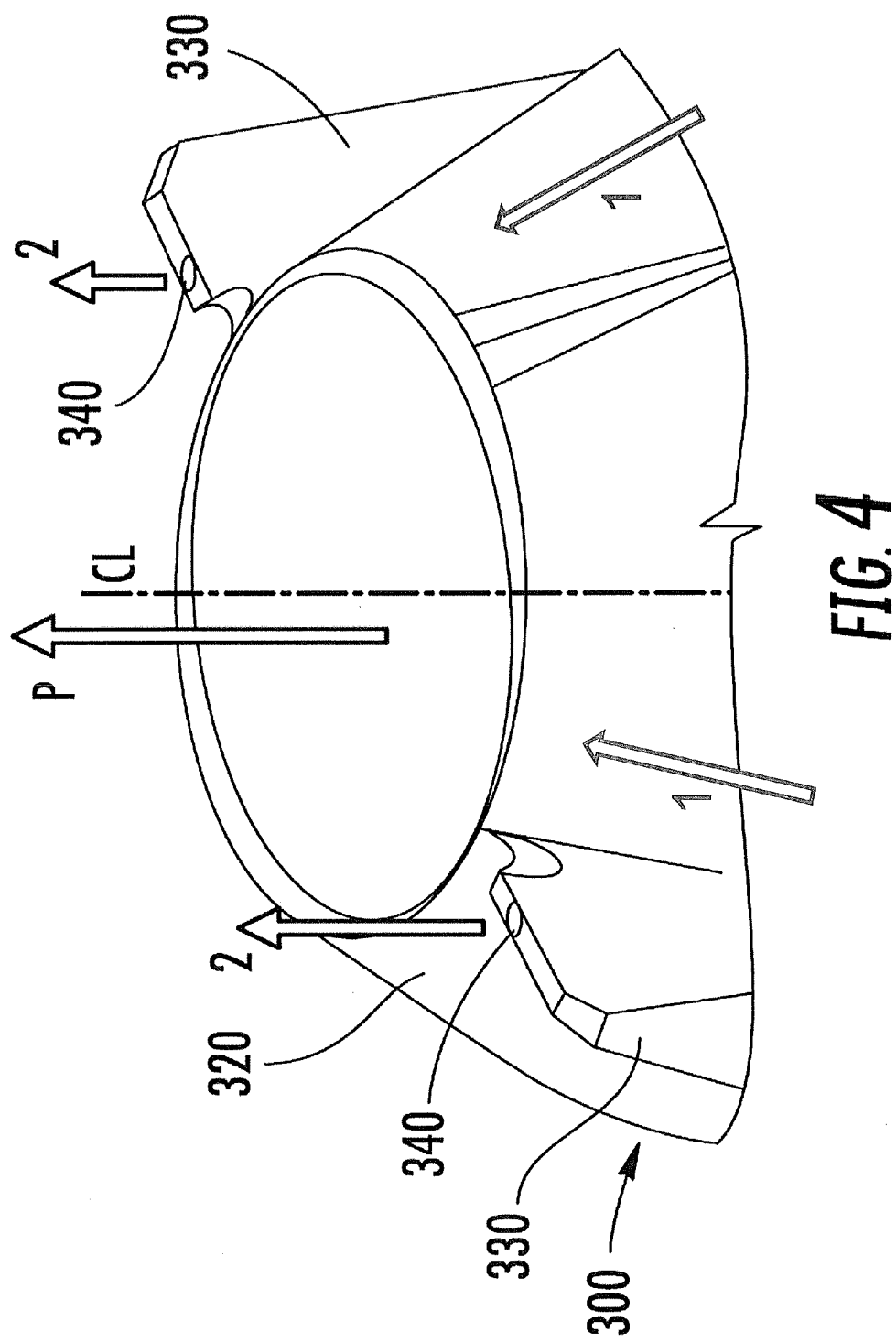
FIG. 4 is a cutaway view of a portion of a coextrusion apparatus used to manufacture cables with discontinuities.

FIG. 4 is a cutaway section view of a coextrusion flow diverter 300 that can be used in conjunction with an extrusion crosshead commonly used to form an annular jacket such as the jacket 30 shown in FIG. 2. The flow diverter can be a modification of an existing component of an extrusion apparatus. In such an extrusion apparatus, the extrusion tip and die are directly downstream of flow diverter 300. The arrows 1 in FIG. 4 illustrate the flow direction of a first molten extrudate, and the arrows 2 indicate the flow direction of a second molten extrudate. The flow diverter 300 has an exterior surface 320 over which flows the first molten extrudate material that is used to form the main portion 55 of the jacket 30. The diverter 300 includes a pair of struts or fins 330, each having a port 340 that allows introduction of the second molten extrudate material used to form the discontinuities 50 into the flow of the first molten extrudate. The flow diverter 300 acts to divide the first material around the ports 340 supplying the second material. The first and second extrudate materials join downstream of the flow diverter 300. As the first and second materials are extruded, a core (not shown) including one or more optical fibers advances along the center line CL in the process direction P. The first and second extrudate materials draw down, cool, and solidify around the fiber optic core advancing through the crosshead to form the jacket 30. The tactile locator features 60 can be included by forming an exterior radius in the extrusion die. If desired, strength members, such as the strength members 66, can be introduced into the extrusion process and embedded in the jacket 30.

Figure 5A:
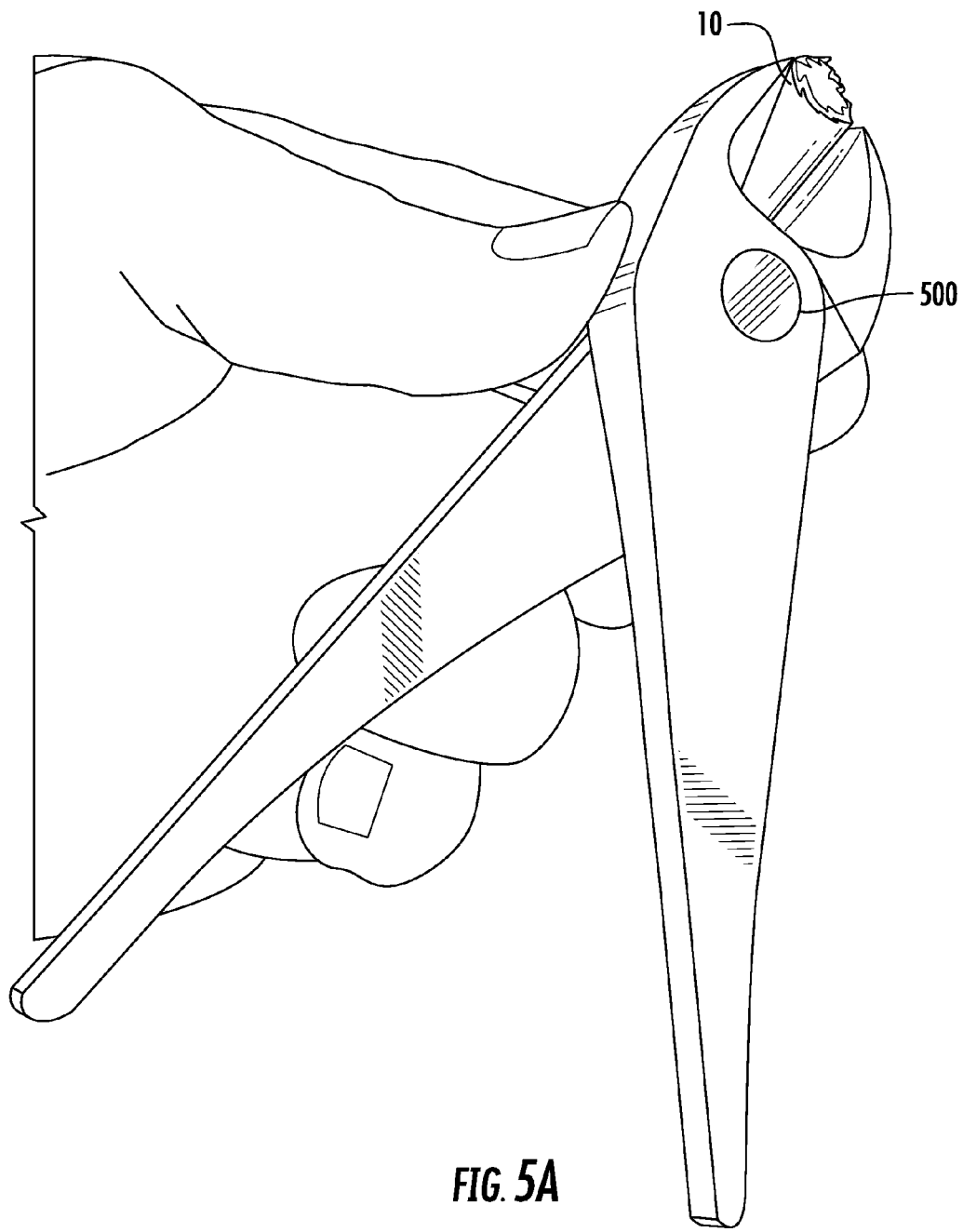
FIGS. 5A-5C illustrate a process for accessing the end of a cable as illustrated in FIG. 1.
Figure 5B:
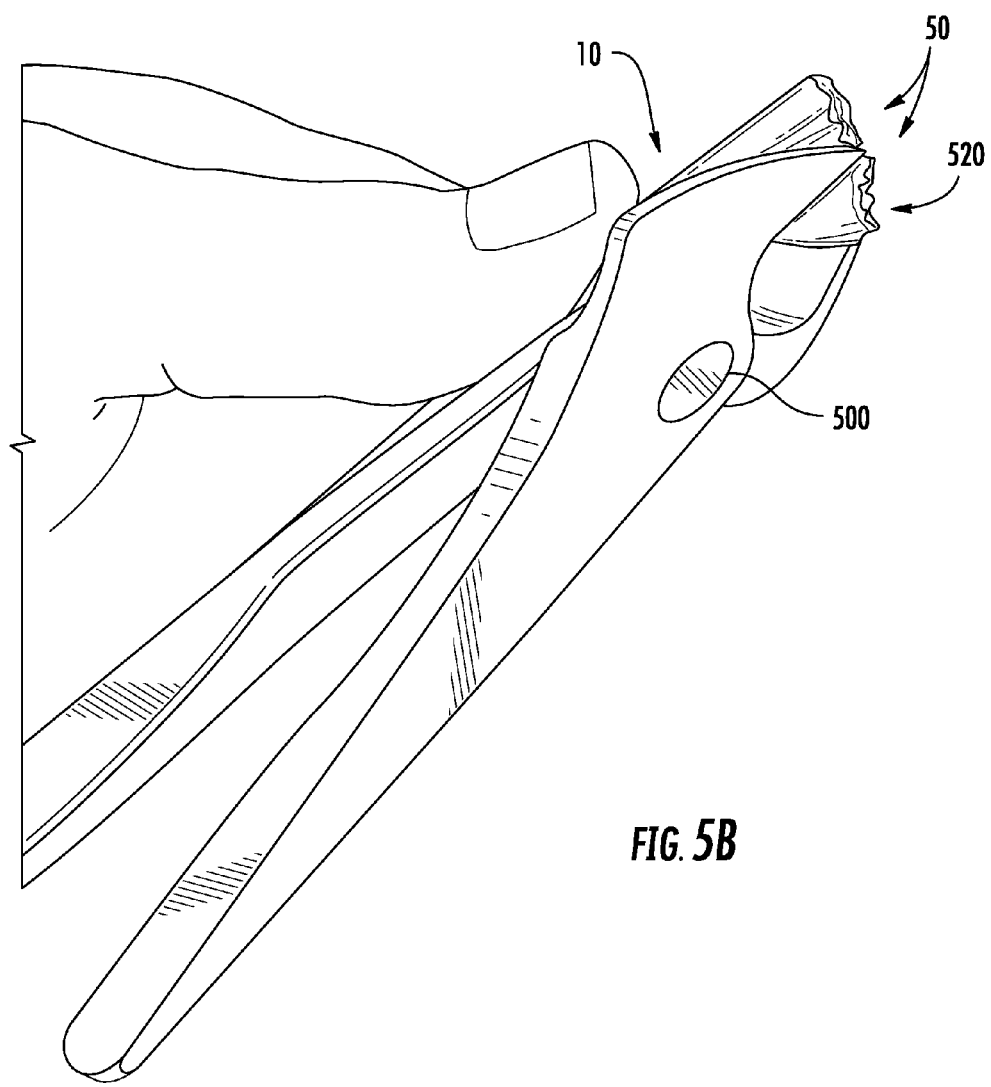
Figure 5C:
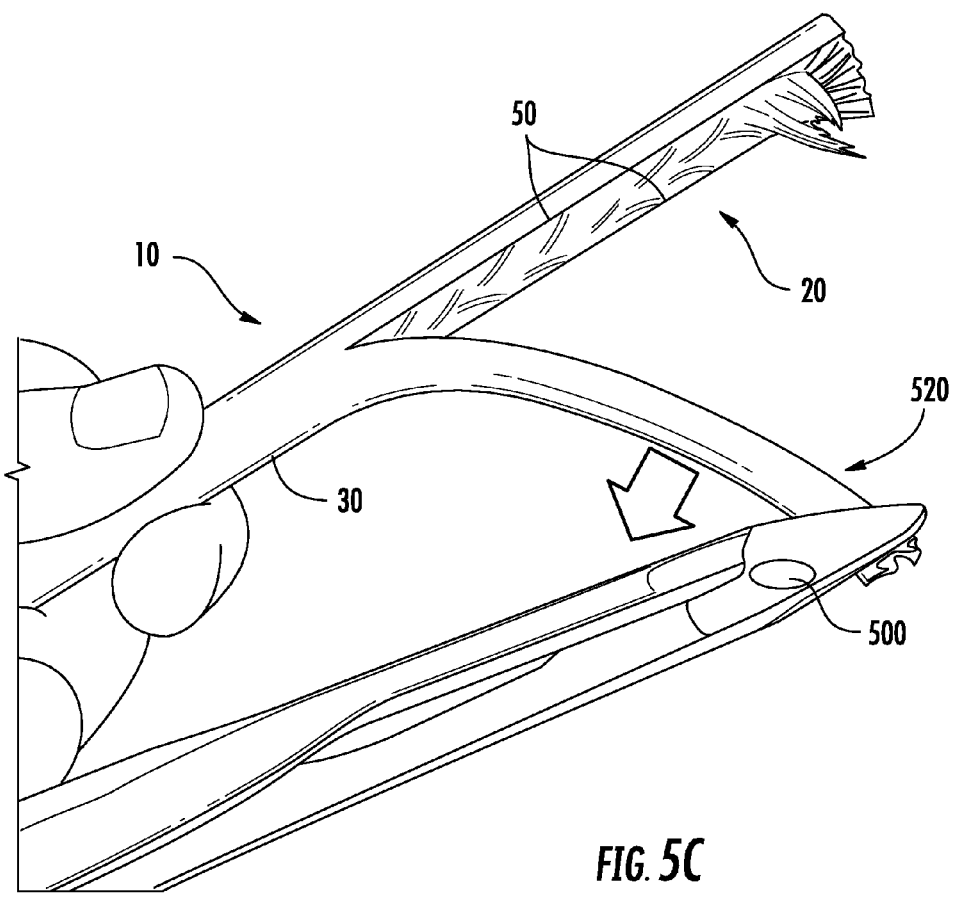

FIGS. 5A-5C illustrate a process for accessing the end of a cable as illustrated in FIG. 1. Referring to FIG. 5A, a technician uses a tool 500 such as side cutters or pliers to pinch the cable is pinched across less than 180 degrees of arc of the cable exterior, such as between of the features 60. The blades of the tool 500 are oriented to pinch the same side of the cable 10, as delineated by the locator features 60. Pinching one side of the cable 10 causes the cable jacket 30 to begin separating at the discontinuities 50. Referring to FIG. 5B, after separation is initiated, a section 520 of the jacket 30 located between the discontinuities 50 is pulled away from the remainder of the jacket 30. Tearing can be facilitated by twisting the section 520. Referring to FIG. 5C, the technician tears the section 520 for a desired length using the tool 500. The core 20 is then accessible for connectorization, etc.

Figure 6A:
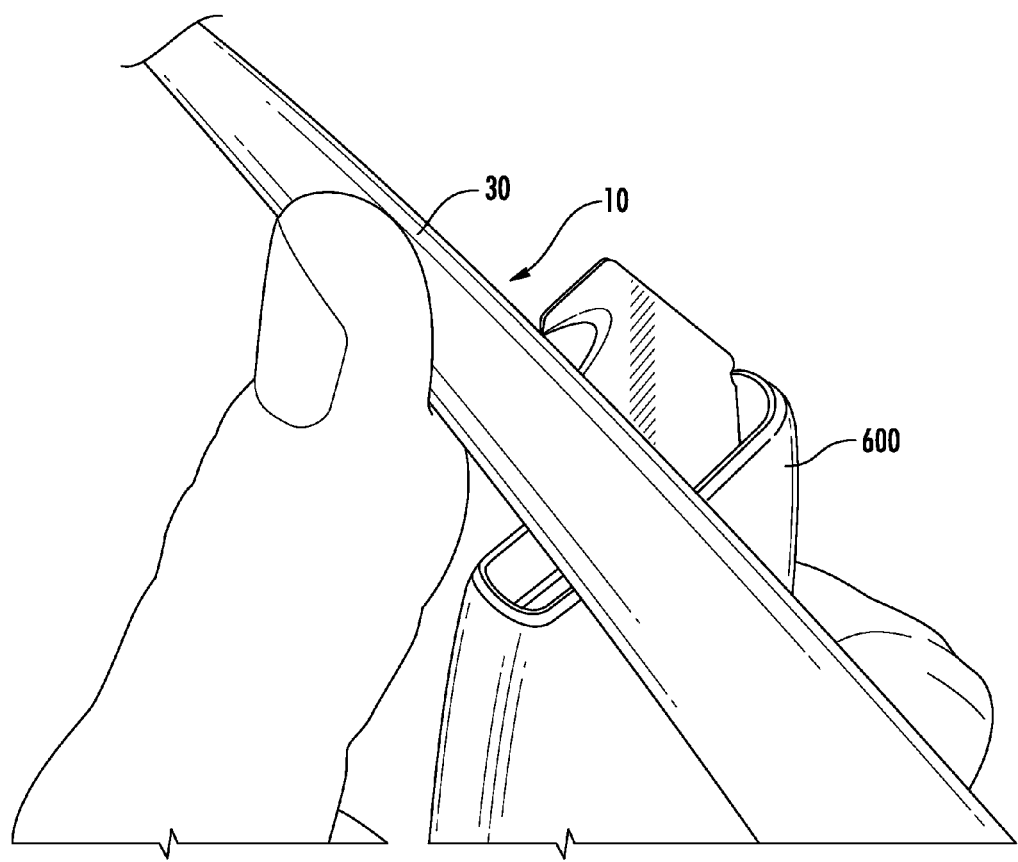
Figure 6C:
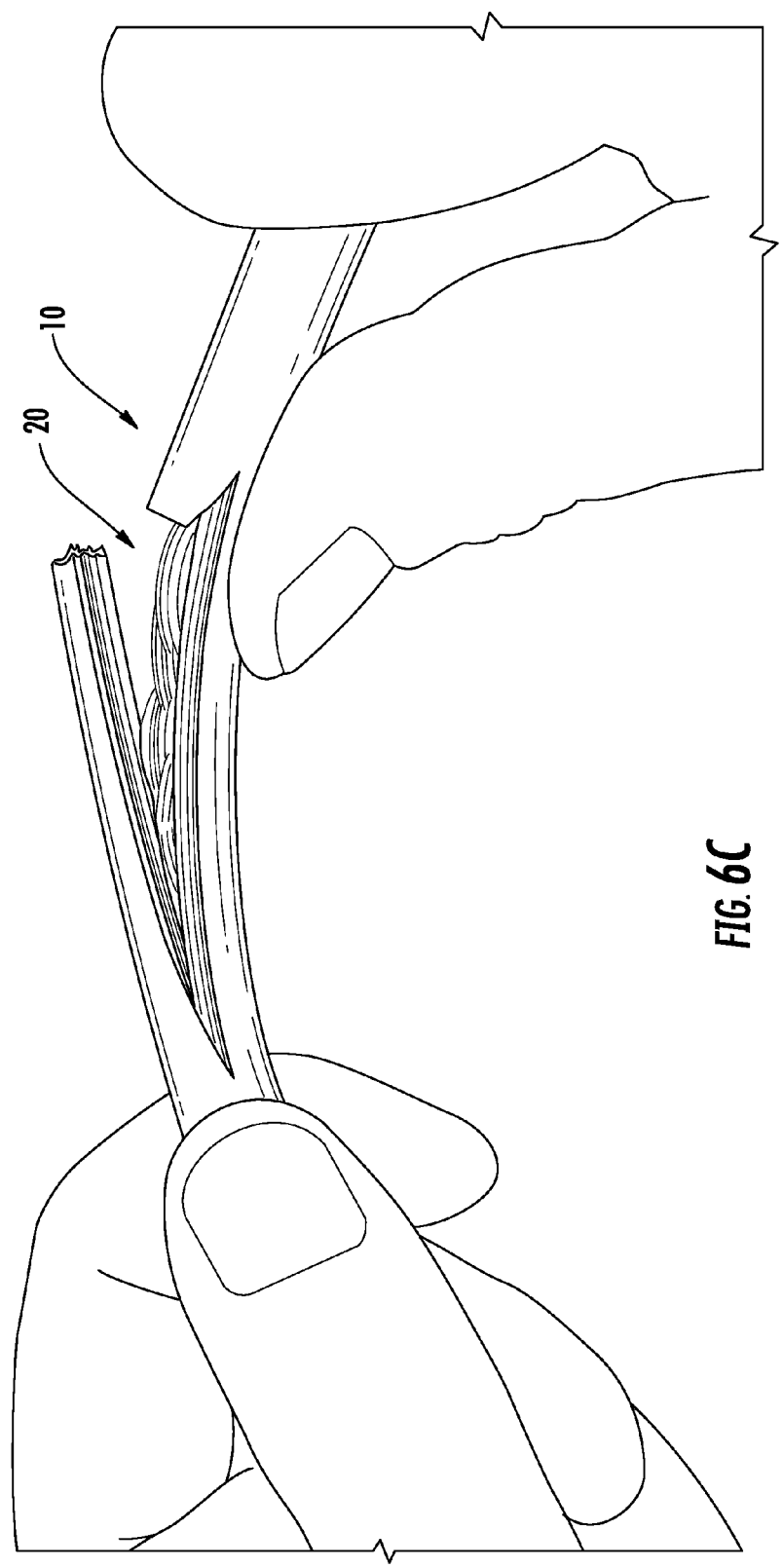

FIGS. 6A-6C illustrate a process for mid-span access for a cable as illustrated in FIG. 1. Referring to FIG. 6A, a technician uses a razor tool 600 to form a ring cut in the jacket 30 that is approximately ¾ of the jacket thickness. The cable 10 is then flexed to break the remaining jacket material. While a razor blade tool is used in this step, it is the sole step in which a very sharp bladed tool is used, as opposed to multiple steps in conventional access methods. Referring to FIG. 6B, the technician shaves the jacket at each of the two locator features 60 with a sheath removal tool 650. The tool can be, for example, Corning Cable Systems' Cable Sheath Removal Tool, Catalog #RPXS-000. The jacket 30 only needs to be shaved for approximately six inches, on only one side of the ring cut line. Referring to FIG. 6C, the cable 10 is flexed to initiate the separation of the two jacket halves. The core 20 is then accessible for connectorization, etc.

According to the present embodiments, one or more discontinuities in a cable jacket can be arranged to provide relatively easy access to a cable core. The ease of access can be defined, for example, by the force required to pull, or peel away a section of the cable jacket at one or more discontinuities. The peel force can be measured as a direct force measurement, in Newtons, of the force a person must exert as the jacket section is peeled away from the cable core. It is understood that the jacket will not be perfectly uniform, and that a person or machine cannot exert a perfectly uniform force as the jacket is peeled, so "peel forces" described in this specification indicate an average force exerted as a distance of the jacket section is peeled back. It is also understood that peel forces according to the present embodiments are measured without any additional modifications to the cable jacket exterior, such as by scoring. The peel forces can be relatively low when compared to the forces required to access a cable without extruded discontinuities. For example, a peel force may be less than about 90 Newtons (N). In exemplary embodiments, the peel force required may be from about 20N to about 65N. Peel forces are defined herein to include any force great enough to cause the jacket material to rip, tear, or otherwise separate along the discontinuities 50 for accessing the cable core.

Figure 7A:
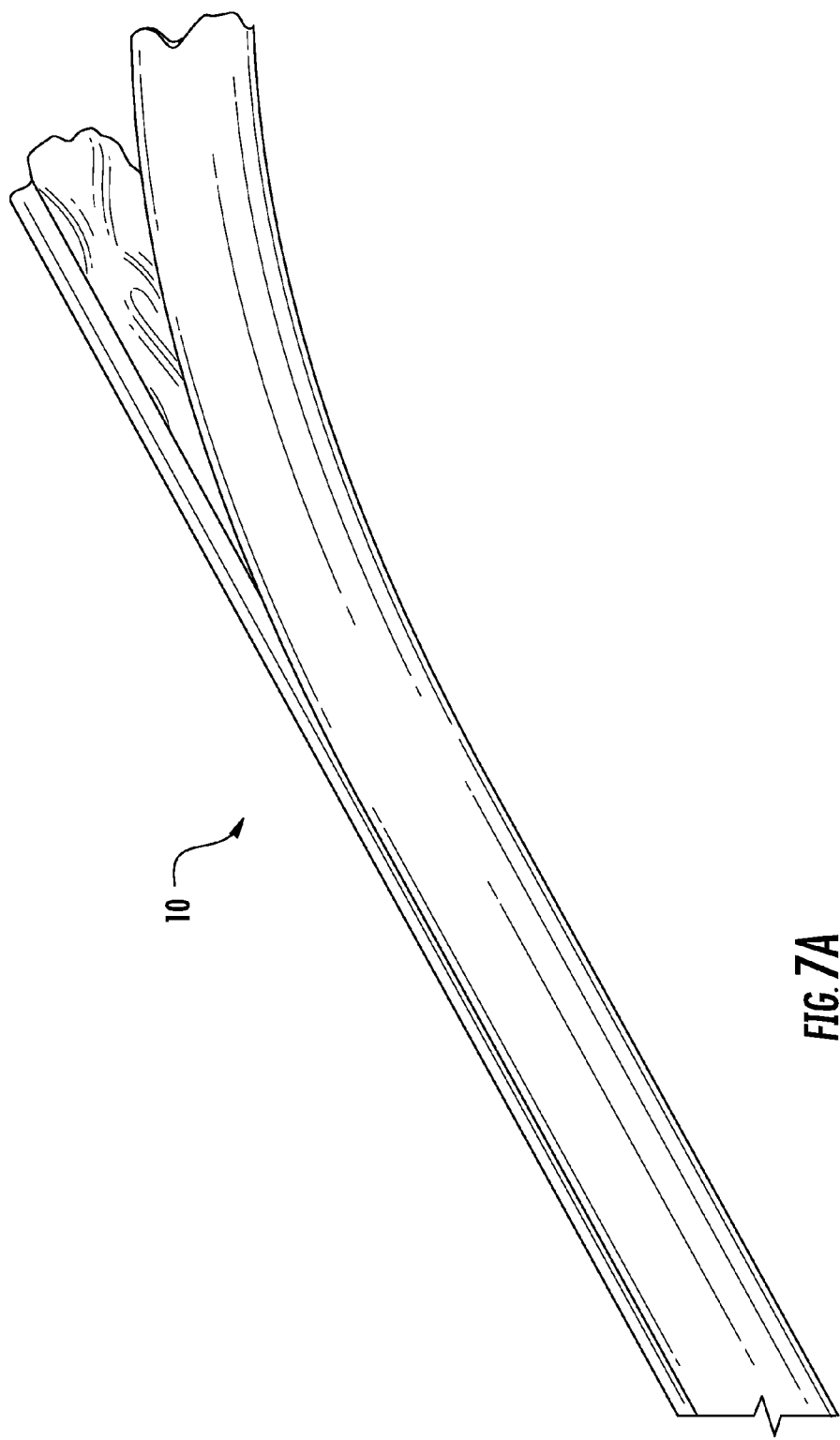
FIGS. 7A-7B illustrate a method of manually determining peel force in the cable of FIG. 1.
Figure 7B:
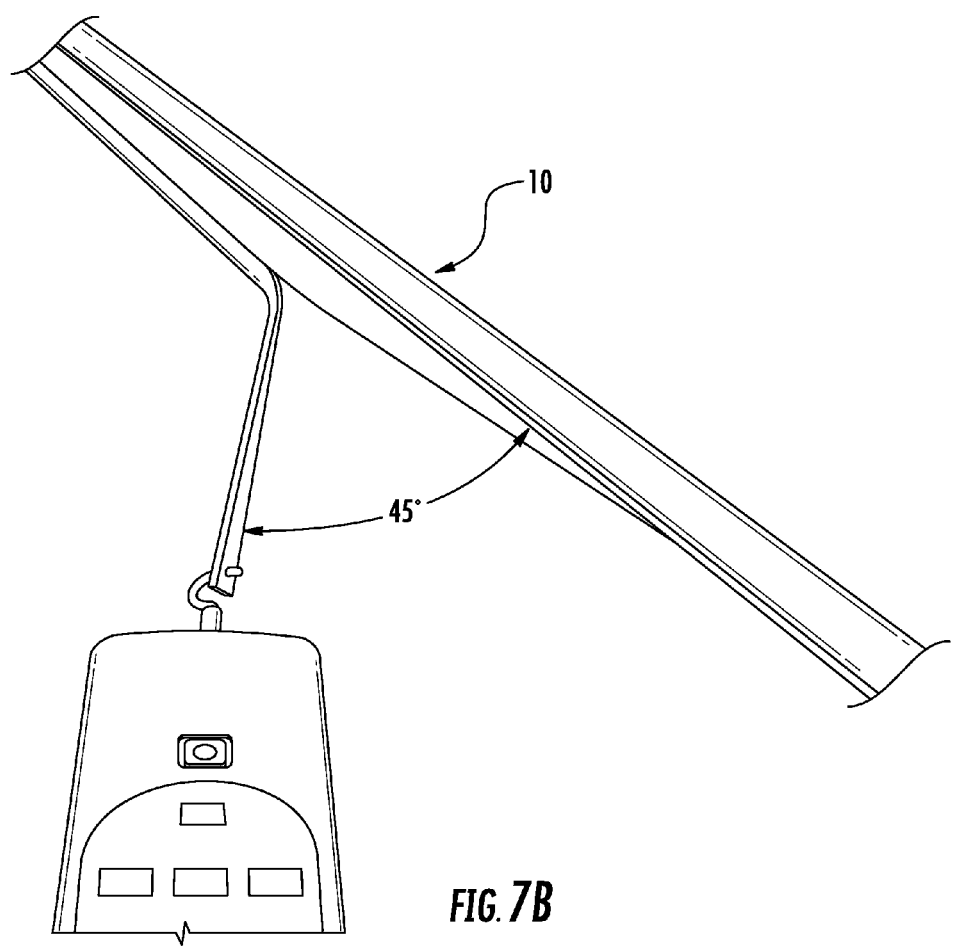

It is relatively easy to measure peel force. FIGS. 7A and 7B steps in a method of illustrating peel force in the cable 10 of FIG. 1. Using cable 10 as a reference, about 25 mm of jacket is cut away from one end of the cable 10. The ends of the cable 10 are secured to a bench or other sturdy surface. A small hole is placed in the jacket proximal to the edge of the jacket where it was cut away from the core, as shown in FIG. 7A, and one end of an "S" hook is inserted into the hole in the jacket. If the cable includes a pair of spaced discontinuities, the hole is formed midway between the two discontinuities. A lanyard or wire is attached to the other end of the S hook. The lanyard is fixed to a force gauge, such as a Chatillon gauge available from Ametek Test and Calibration Instruments of Largo, Fla. As shown in FIG. 7B, the force gauge is pulled by hand or by some mechanical means, away from the cable at an angle of 45 degrees to the cable centerline, until the section of the jacket attached to the S hook peels away from the rest of the jacket. The jacket section is pulled for a distance of 250-500 mm away from the initial jacket removal location. The average peel can be calculated as the average force measured by the force gauge as the jacket section is pulled along the selected distance.

Figure 8:
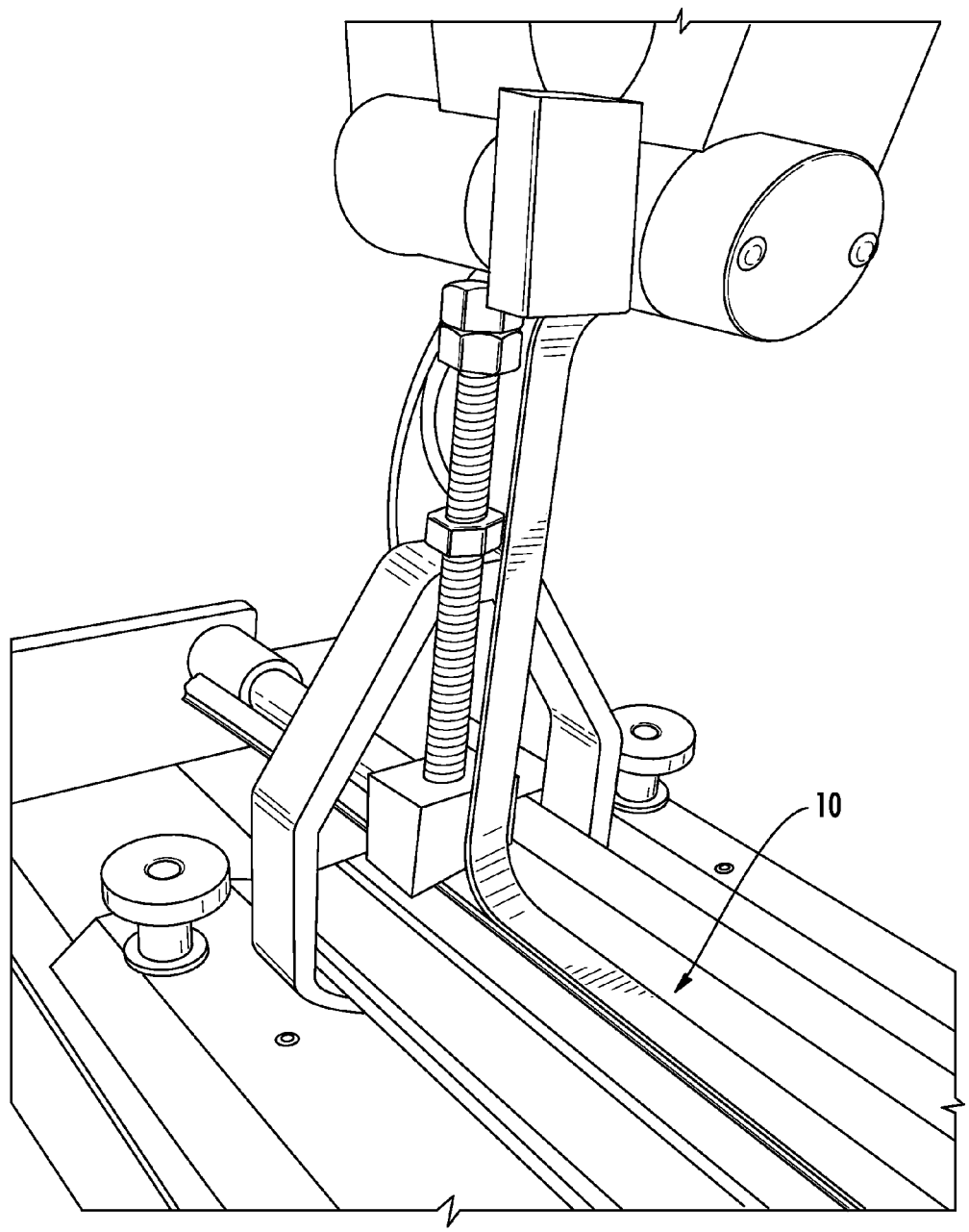
FIG. 8 illustrates a method of determining peel force in the cable of FIG. 1 using a force measuring machine.

In an alternate method of measuring peel force, a force testing machine, such as those available from Instron®, pulls the section of cable away from the remainder of the cable at angle of 90 degrees to the remainder of the cable 10. This machine is shown in FIG. 8. The cable 10 is secured to a linear slide that translates the cable beneath the portion of the machine that is secured to the jacket section being peeled away. In this arrangement, the cable 10 slides beneath the force gauge that measures the tension on the section being removed, so that the section can be peeled away at a 90 degree angle. The tension in the removable section can be averaged over a desired distance to obtain the average peel force.

In general, the separation properties disclosed in this specification may be obtained by coextruding the discontinuities from a different material than the material used to form the main portion of the jacket. As an alternative method, the discontinuities may be made from the same material as the remainder of the jacket, but subjected to different curing conditions, for example.

What is claimed is:

1. A method of making a cable, comprising:
advancing a core in a first direction, the core including at least one optical fiber capable of conveying communication signals; and
extruding a jacket around the core, the extruding comprising:
introducing a first polymeric extrudate material into the extrusion apparatus;
introducing a first flow of a second polymeric extrudate material into the first polymeric extrudate material through a first port;
introducing a second flow of extrudate material into the first polymeric extrudate material through a second port;
forming a tactile indicator extending lengthwise along the exterior of the jacket denoting the location of the second polymeric extrudate material; and
allowing the first and second extrudate materials to draw down and cool around the core, the first polymeric extrudate material forming a main portion of the jacket, the first flow forming a first discontinuity in the main portion, and the second flow forming a second discontinuity in the main portion, wherein the first and second discontinuities are at least partially embedded in the main portion and the core is located between first discontinuity and the second discontinuity,
wherein a section of the jacket located between the first and second discontinuities is separable from a remainder of the jacket by a peel force on the section of less than 90 Newtons (N).

2. The method of claim 1, wherein the first discontinuity is wholly embedded in the main portion, wherein the core further comprises a bundle of a plurality optical fibers bundled by a binder.

3. The method of claim 1, the jacket having an annular cross-section with an interior surface and an exterior surface with a jacket thickness therebetween from 0.5 mm to 2.0 mm, and wherein a cross-sectional area of each discontinuity is less than 5% of a cross-sectional area of the jacket.

4. The method of claim 1, wherein the first extrudate material includes a first polymer and the second extrudate material includes second polymer, the second extrudate material further including between 1% to 20% by weight of the first polymer.

5. The method of claim 1, further comprising advancing an elongate strength member along the first direction, wherein the jacket is extruded around the strength member.

6. The method of claim 1, wherein the first discontinuity has a maximum width measured perpendicular to a radius passing through the first discontinuity that is less than 0.2 mm.

* * * * *